(No Model.)
E. F. PENDEXTER.
COMBINED DOOR LOCK AND SKID.
No. 557,694. Patented Apr. 7, 1896.
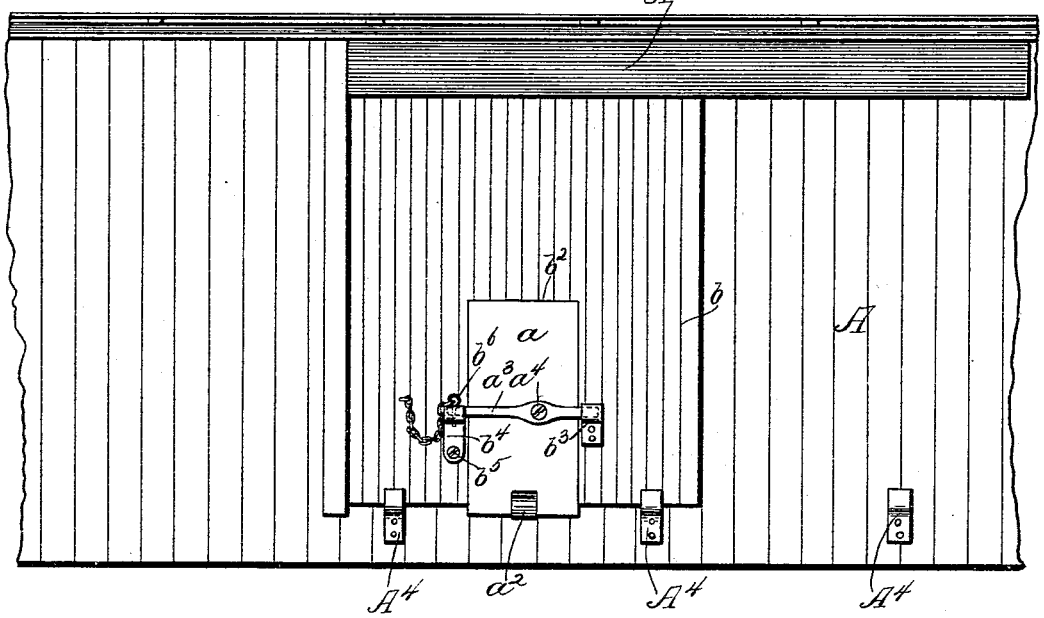
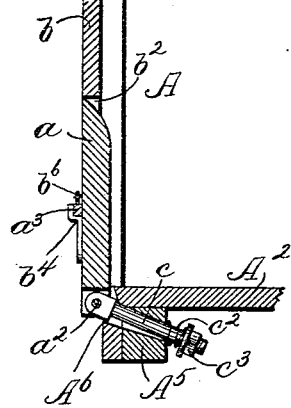
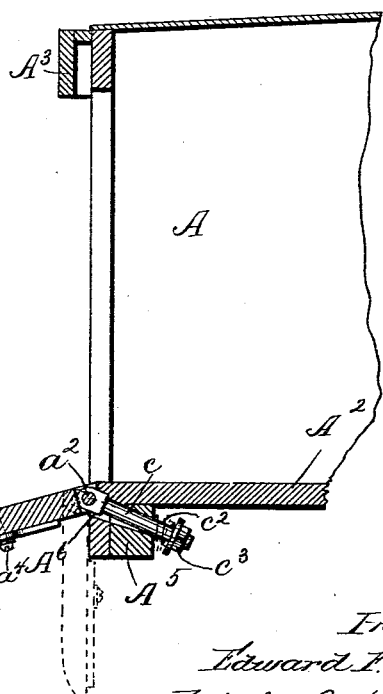
Witnesses
Jas. J. Maloney.
J. J. Livermore
Inventor,
Edward F. Pendexter,
by Jos. P. Livermore
Att'y.

UNITED STATES PATENT OFFICE.

EDWARD F. PENDEXTER, OF MILFORD, MASSACHUSETTS.

COMBINED DOOR-LOCK AND SKID.

SPECIFICATION forming part of Letters Patent No. 557,694, dated April 7, 1896.

Application filed July 22, 1895. Serial No. 556,804. (No model.)

*To all whom it may concern:*

Be it known that I, EDWARD F. PENDEXTER, of Milford, county of Worcester, State of Massachusetts, have invented an Improvement in a Combined Door-Lock and Skid, of which the following description, in connection with the accompanying drawings, is a specification, like letters on the drawings representing like parts.

The present invention relates to a combined door-fastening and skid, and is especially adapted as a fastening for freight-car doors, being so arranged that the lowering of the skid into position to be used in loading or unloading the car unlocks the door thereof, while after the car is ready for removal the door may be closed and the skid folded thereon or moved to a position in which it is out of the way, and at the same time it serves as a lock or fastening for the door.

In carrying out the invention the skid is pivotally connected at one end to the floor of the car, so that when it is in a vertical position it will stand in the same space occupied by the door of the car or parallel thereto, and the said door when closed is adapted to be engaged by the skid when it is thus folded or upright in such a way as to become fastened or locked thereby. In order to hold the skid in folded position, a hasp, locking-bar, or similar fastening device is provided, coöperating with staples or brackets on the door or skid, and the said hasp may be secured in any suitable way, as by a padlock or seal. When the car is to be loaded or unloaded, the skid is unfastened from the door and let down until its end rests upon the platform or floor between which and the car articles are to be moved, the changed position of the skid thus leaving the door free to open.

Figure 1 is a side view of a portion of the car, showing the door and skid engaged and the door thus fastened. Fig. 2 is a section through the door and the skid, showing the relation of one to the other and also showing the preferred form of pivotal joint by which the skid is connected to the floor of the car; and Fig. 3, a similar section with the door open or removed and the skid in position for use in loading and unloading, a portion of a floor or platform being shown outside the car with the end of the skid resting thereon.

While the invention is especially applicable for use with freight-cars, and is thus shown herein and will be so described, it should be understood that substantially the same construction may be applied to the door of a building, such as a warehouse, between which and wagons or cars heavy articles are required to be transferred.

The skid $a$ is pivoted at $a^2$ adjacent to the edge of the floor $A^2$ of the car-body A. Thus by turning the said skid upon its pivot the free end thereof may be brought to a bearing upon any surface—as, for example, a platform B, Fig. 3—so as to form a bridge between such surface and the car-floor to support articles being moved from one to the other.

In order that the skid when out of use may be moved to position in which it will be out of the way and at the same time serve as a means for securing the door of the car in its closed position, the said door $b$ is adapted to be secured to the skid, preferably, in the case of a sliding door, as shown, being provided with shoulders to engage the edges of the skid. This may conveniently be accomplished by cutting out a portion of the door, thus making a recess $b^2$ conforming in size and shape to the size and shape of the skid, so that when the latter is turned upon its pivot to the position shown in Figs. 1 and 2 it will fit into said recess, engaging with the shoulders formed by the edges thereof and thus preventing the the lateral movement of the door in its hanger $A^3$ and brackets $A^4$, in which it is herein shown as supported, this being the construction now ordinarily used in freight-cars, although it is obvious that the door may be hung in any suitable or usual way.

The skid thus engaged with the door may be held in its upright position in any suitable way, it being herein shown as provided with a locking-bar $a^3$, pivoted at $a^4$ upon the outer or under side thereof, the said bar engaging at one end with a bracket $b^3$ upon the door $b$ at one side of the opening $b^2$ and at its opposite end with a similar bracket $b^4$ upon the opposite side of the said opening. The said bracket $b^4$ is pivoted at $b^5$, so that it can be moved to one side to release the end of the lever $a^3$, thus allowing the said lever to be turned on its pivot $a^4$ until its opposite end is disengaged from the bracket $b^3$, after which the skid is free to swing upon its pivot $a^2$. The locking-bar $a^3$ can be secured in the brackets $b^3$ and $b^4$ in any suitable way, the fastening herein shown being the usual pin $b^6$, secured to the side of the car to prevent its becoming mislaid, and adapted to be sealed in registering holes in the bar $a^3$ and bracket $b^4$.

While any form of pivotal or hinged support may be used to secure the skid to the floor of the car, it is preferable to provide means for supporting the inner end of the skid upon some fixed portion of the car-body and at the same time to have the upper surface of the said skid in line with the surface of the floor, so that articles will pass readily across the line of junction between the two. For this purpose a shoulder $A^6$ is provided in the floor-beam, the upper portion of said shoulder being below the surface of the floor, so that when the under surface of the skid rests upon said shoulder the upper surface thereof will be in line with the surface of the floor $A^2$, as clearly shown in Fig. 3. Moreover, when the skid is in its upright position, out of use, the weight of the same will be supported upon the said shoulder, as shown in Fig. 2. In order to allow the skid to be moved readily from one position to the other, the pivot is so arranged as to yield somewhat, as indicated. A practical form of such device is herein shown, the lower or inner end of the skid being pivoted to the end of a rod $c$ extending inward through a bore or opening in the sill $A^5$ and provided with a spring $c^2$ interposed between the said sill and an enlargement (herein shown as a nut $c^3$) upon the inner end of the pivot-rod $c$. Thus when the skid is lowered to the position shown in Fig. 3 the inner end thereof will be drawn up snug against the edge of the floor $A^2$ and will extend over the shoulder $A^6$, so as to be supported thereon instead of on the pivot-joint itself.

The pivot bar or bolt $c$ has a swivel connection with the car-body, its round shank fitting in a round bore in the sill, so that in case the skid should be accidentally left hanging at the side of the car, as shown in dotted lines, Fig. 3, it will be capable of swinging freely lengthwise of the car, thus preventing serious damage in case it should strike an obstruction in the movement of the car.

It is not intended to limit the invention to the specific construction herein shown and described, since modifications may obviously be made.

I claim—

1. The combination with a door, of a skid pivotally connected to the floor under said door, and means for securing said skid to the door when closed, as described.

2. The combination, with a sliding door, of a skid pivotally connected to the floor under said door, shoulders in said door adapted to engage the edges of the skid, and means for securing the said skid thus engaged to the door, substantially as described.

3. The combination with a sliding door, of a skid pivoted to the floor below the said door, a supporting-shoulder in said floor for the pivoted end of said skid, and a movable pivot-bar whereby the said skid is free to move into engagement with the said shoulder, substantially as described.

4. The combination with a car, of a folding skid and support therefor, and a hinge connection between said support and skid, said support having a swiveled connection with the car-body, substantially as and for the purpose described.

In testimony whereof I have signed my name to this specification in the presence of two subscribing witnesses.

EDWARD F. PENDEXTER.

Witnesses:
H. J. LIVERMORE,
M. E. HILL.